(12) United States Patent
Uehara

(10) Patent No.: US 9,863,361 B2
(45) Date of Patent: Jan. 9, 2018

(54) DIESEL ENGINE CONTROL DEVICE AND CONTROL METHOD

(71) Applicant: Nissan Motor Co., Ltd., Yokohama-Shi, Kanagawa (JP)

(72) Inventor: Isshou Uehara, Kanagawa (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 15/312,234

(22) PCT Filed: May 27, 2014

(86) PCT No.: PCT/JP2014/063949
§ 371 (c)(1),
(2) Date: Nov. 18, 2016

(87) PCT Pub. No.: WO2015/181881
PCT Pub. Date: Dec. 3, 2015

(65) Prior Publication Data
US 2017/0130667 A1    May 11, 2017

(51) Int. Cl.
*F02B 3/00* (2006.01)
*F02D 41/40* (2006.01)
*F02B 17/00* (2006.01)
*F02D 37/02* (2006.01)
*F02D 41/38* (2006.01)

(52) U.S. Cl.
CPC .......... *F02D 41/402* (2013.01); *F02B 17/005* (2013.01); *F02D 37/02* (2013.01); *F02D 2041/389* (2013.01); *F02D 2200/02* (2013.01)

(58) Field of Classification Search
CPC ...... F02D 41/40; F02D 41/402; F02D 41/403; F02B 3/06
USPC ......... 123/294, 299, 304, 305; 701/103, 105
See application file for complete search history.

(56) References Cited

U.S. PATENT DOCUMENTS

| 2007/0245982 A1* | 10/2007 | Sturman ................. F02B 21/00 123/26 |
| 2009/0055076 A1* | 2/2009 | Onishi ................ F02D 41/1458 701/103 |
| 2011/0067395 A1* | 3/2011 | Suhocki .................. F02B 33/36 60/602 |
| 2012/0000197 A1* | 1/2012 | Maruyama .......... F02D 41/0057 60/605.2 |
| 2012/0004826 A1* | 1/2012 | Shimo ................. F02D 41/3035 701/103 |

FOREIGN PATENT DOCUMENTS

JP    2000227061 A    8/2000
JP    2005233163 A    9/2005

* cited by examiner

Primary Examiner — John Kwon
(74) Attorney, Agent, or Firm — Young Basile Hanlon & MacFarlane, P.C.

(57) ABSTRACT

A direct injection diesel engine is provided with a fuel injection nozzle which is capable of performing a multistage injection. In a middle-or-high load region, in order to decrease soot, an after-injection is performed immediately after a main injection. In a case of fuel with a low Cetane number, the after-injection can cause a worsening of soot. Hence, an ignition delay interval (period of time) of the main injection is determined. In a case where the ignition time delay interval (period of time) is equal to or above a threshold value, the after-injection is inhibited.

6 Claims, 4 Drawing Sheets

DIESEL ENGINE CONTROL DEVICE AND CONTROL METHOD

TECHNICAL FIELD

The present invention relates to control apparatus and control method for a direct injection diesel engine in which a fuel injection nozzle which is capable of performing a multi-stage injection is equipped and an after-injection is performed immediately after a main injection.

BACKGROUND

In order to suppress a generation of soot which provides a problem in the direct injection diesel engine, a technique in which an after-injection in a relatively short period of time is performed immediately after a main injection and soot generated in association with a combustion of the main injection is combusted together with fuel due to the after-injection is described in Japanese Patent Application First Publication No. 2005-233163 and Japanese Patent Application First Publication No. 2000-227061 and so forth.

In such a technique of the after-injection as described above, a certain optimum value is present as an interval from a time at which the main injection is ended to a time at which the after-injection is started. As shown in a characteristic a of FIG. 5, as the interval shown in a lateral axis of FIG. 5 becomes gradually larger, a reduction of soot is seen when the after-injection at an appropriate interval is performed. It should be noted that a left end of a lateral axis of FIG. 5 indicates a case where the interval is zero, namely, a case where no after-injection is performed (a case where the injection is performed without a split of the injection into the main injection and after-injection is not made).

However, in a case where a Cetane number of fuel is low, a tendency of a reduction of soot when the interval is appropriately given is observed as shown in a characteristic b of FIG. 5. However, as compared to a case where no after-injection is performed, an emission level of soot rather becomes higher.

It can be thought that, according to inventor's research, this is caused by a low Cetane number of fuel so that an ignition delay of a main combustion (a combustion according to the main injection) is increased and a pre-mixture combustion rate is increased.

That is, as a first cause, gas flow within a cavity after the ignition in association with an increase in the pre-mixture combustion rate is increased and a rising speed of gas tried to flow out toward an upward direction from the cavity is increased. Therefore, light weight sprays of the after-injection are caused to flow in a rising flow of gas and are brought in a space at a lower side of a cylinder head (a gap space between the cylinder head and a crown surface of a piston). This space is under a low-temperature atmosphere field in an expansion stroke. Hence, an oxidization speed of soot due to fuel of the after-injection and the main combustion is reduced.

FIGS. 6A-6D show situations in which the sprays according to the after-injection are affected according to a magnitude of the pre-mixture combustion rate and in which gas flow within a combustion chamber is indicated in minute arrow marks. FIG. 6A shows a state of the combustion chamber at a time immediately after the after-injection in a case where fuel having a relatively high Cetane number is used. A spray F after the after-injection is advanced toward an inside of the cavity and, at a bottom section of the cavity, a reverse squish flow R toward an outer peripheral side from the inside of the cavity is generated in association with the ignition combustion. FIG. 6B shows a state of a stage of combustion chamber at which the piston is slightly lowered from the state of FIG. 6A. Although spray F collides against reverse squish flow R, the reverse squish flow is not so strong that a quantity of an upward brought out spray is small (refer to a region denoted by an enclosure of an ellipse M).

Whereas, FIGS. 6C and 6D show situations of the combustion chamber at the same crank angle as the cases of FIGS. 6A and 6B, respectively, in a case where the Cetane number of fuel is low. As shown in FIG. 6C, since the pre-mixture combustion rate is increased in association with the ignition delay when the Cetane number is low, reverse squish flow R is strongly generated. Consequently, as shown in FIG. 6D, light weight spray F of the after-injection is brought out toward the upward direction (refer to the region denoted by the enclosure of ellipse M). It should be noted that those in bubble forms in FIGS. 6B and 6D are individually dispersed sprays.

In addition, as a second cause, it can be considered that, due to the ignition delay of the main combustion, the after-injection is performed under a low oxygen field during the main combustion and soot is increased due to a deficiency of oxygen.

SUMMARY

It is an object of the present invention to avoid a worsening of soot due to the after-injection when the Cetane number of fuel is low as described above.

According to the present invention, there is provided a control apparatus for a direct injection diesel engine, the diesel engine having a fuel injection nozzle capable of performing a multi-stage injection and in which an after-injection is performed immediately after a main injection, the control apparatus is configured to inhibit the after-injection when a pre-mixture combustion rate in a combustion according to the main injection is large.

When the Cetane number of fuel is low, the ignition delay is increased and the pre-mixture combustion rate is increased. In such a case as described above, the after-injection is inhibited. Thus, the worsening of soot can be avoided.

DETAILED DESCRIPTION OF THE EMBODIMENTS

Hereinafter, a preferred embodiment of the present invention will be explained in details on a basis of attached drawings.

Figure 1:
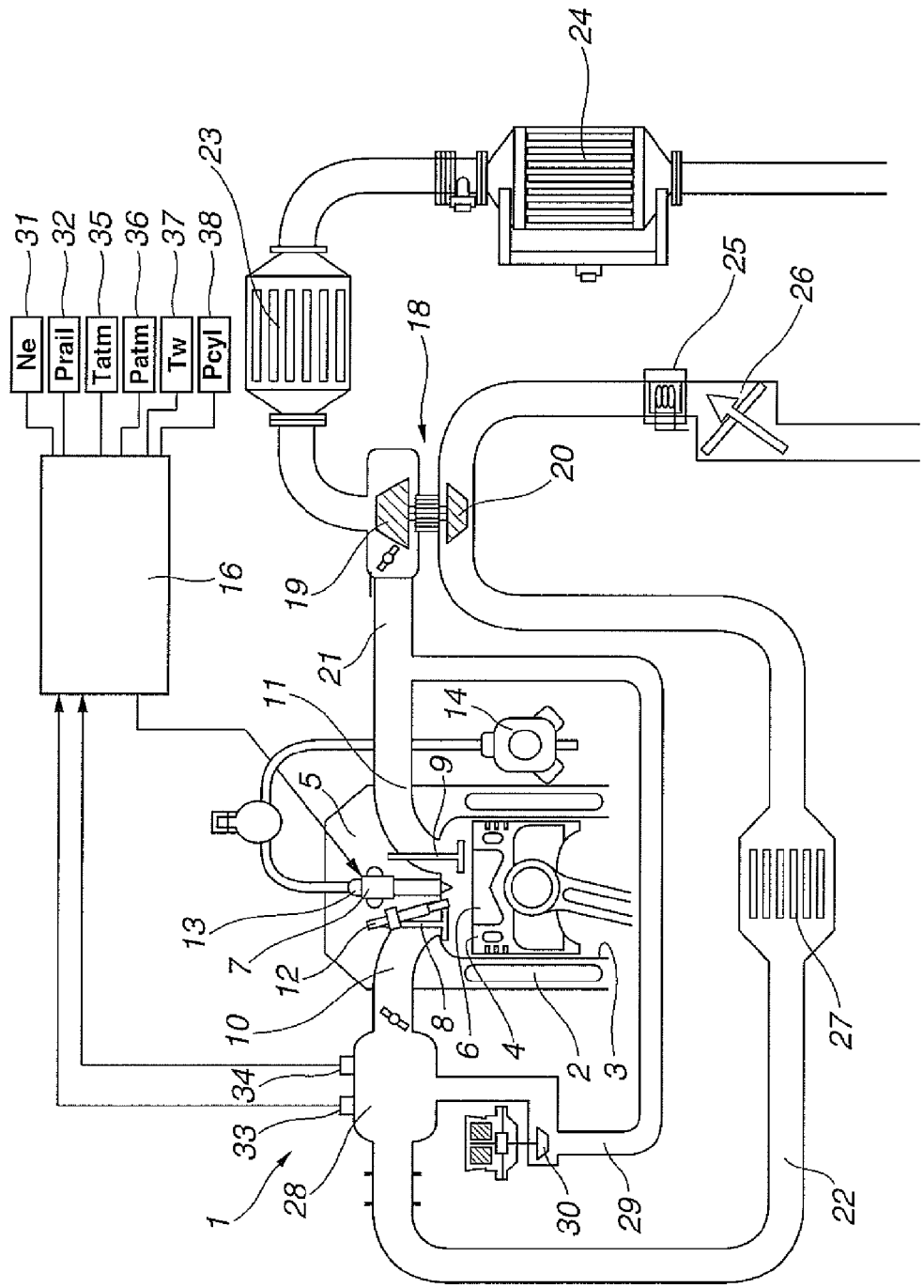
FIG. 1 is a structural explanatory view of a diesel engine in a preferred embodiment.

FIG. 1 is a structural explanatory view representing a direct injection diesel engine 1 together with its intake and exhaust systems. A piston 4 is slidably fitted to a cylinder 3 formed on a cylinder block 2. A cylinder head 5 fixed on an upper surface of cylinder block 2 covers an upper end opening of cylinder 3.

A re-entrant type cavity 6 is recessed on a top surface of piston 4. This cavity 6 is concentrically formed with piston 4 and has a relatively large opening diameter. In addition, a multi-injection-hole fuel injection nozzle 7 is disposed at a center position of cylinder 3 corresponding to a center of cavity 6. In this embodiment, above-described fuel injection nozzle 7 is disposed along a center axial line of cylinder 3, namely, is vertically disposed.

A pair of intake valves 8 and a pair of exhaust valves 9 are disposed on above-described cylinder head 5. The pair of intake valves 8 open and close tip opening sections of an intake port 10 and the pair of exhaust valves 9 open and close tip opening sections of an exhaust port 11.

These intake valves 8 and exhaust valves 9 are disposed in vertical postures in which the respective valve stems thereof are parallel to center axial lines of cylinder 3. A glow plug 12 is disposed adjacently to fuel injection nozzle 7.

Fuel injection nozzle 7 of each cylinder is connected to a diagrammatically shown common rail 13. When a needle (not shown) of fuel injection nozzle 7 is lifted in response to a drive signal from an engine control unit 16, fuel under a high pressure supplied within common rail 13 by means of a high pressure fuel pump 14 is injected. The fuel pressure within common rail 13 is pressure regulated to a predetermined pressure which accords with a driving condition by means of engine control unit 16 via a pressure regulator valve 15. It should, herein, be noted that above-described fuel injection nozzle 7 is a highly responsive characteristic nozzle using a piezoelectric element or so forth. Fuel injection nozzle 7 can inject and split in multiple stages a gross fuel injection quantity determined in accordance with a load.

Diesel engine 1, in this embodiment, is provided with a turbocharger 18. A turbine 19 of turbocharger 18 is disposed in a passage of an exhaust passage 21 and a compressor 20 of turbocharger 18 is disposed in a passage of an intake passage 22. A pre-catalytic converter 23 and a main-catalytic converter 24 are serially arranged at a downstream side than turbine 19 of exhaust passage 21. An airflow meter 25 and an air cleaner 26 are disposed at a downstream side than compressor 20 of intake passage 22. An intercooler 27 is disposed in intake passage 22 between a collector section 28 which is at the downstream side than compressor 20 and compressor 20. Furthermore, an exhaust recirculation unit includes: an exhaust recirculation passage 29 which communicates between a more upstream side position than turbine 19 of exhaust passage 21 and intake collector section 28; and an exhaust recirculation control valve 30 installed to control an exhaust recirculation percentage to a predetermined exhaust recirculation percentage in accordance with an engine driving condition.

Above-described engine control unit 16 inputs detection signals from such sensors as: airflow meter 25 described above; a revolution speed sensor 31 for detecting an engine revolution speed Ne; a rail pressure sensor 32 for detecting a rail pressure Prail within common rail 13; an intake temperature sensor 33 for detecting an intake temperature Tin; a boost pressure sensor 34 for detecting a supercharge (boost) pressure Boost; an atmospheric temperature sensor 35 for detecting an atmospheric (air) temperature Tatm; an atmospheric pressure sensor 36 for detecting an atmospheric pressure Patm; a water temperature sensor 37 for detecting a water (coolant) temperature Tw; and an internal cylinder pressure sensor 38 for detecting an internal cylinder pressure Pcyl.

In such a structure as described above, gross injection quantity Q to be injected from fuel injection nozzle 7 is determined according to the load of diesel engine 1 and a target torque thereof. In addition, a target value of fuel pressure within common rail 13, namely, a target rail pressure tPrail is determined on a basis of gross fuel injection quantity Q, revolution speed Ne, water temperature Tw, atmospheric pressure Patm, and the atmospheric (air) temperature Tatm. Specifically, maps with gross injection quantity Q and revolution speed Ne as parameters are preset for each water temperature, for each atmospheric pressure, and for each atmospheric temperature Ne. By searching these maps, target rail pressure tPrail which accords with the driving condition at that moment is determined.

Figure 2:
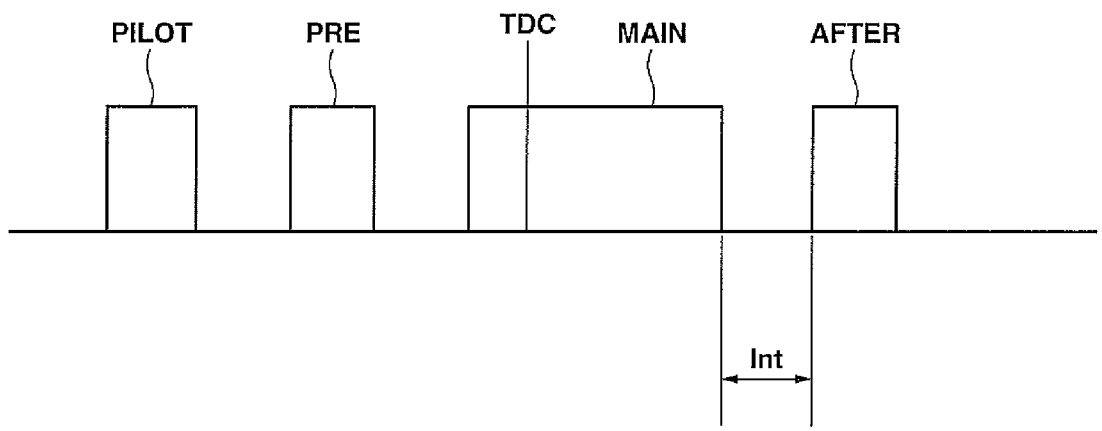
FIG. 2 is an explanatory view of one example of a split injection.

Then, fuel injected from fuel injection nozzle 7 is split in the multiple stages and injected in accordance with the driving condition. For example, as shown in FIG. 2, in addition to a main injection carried out with a top dead center TDC inserted in the main injection, fuel is split into a pilot injection, a pre-injection, and an after-injection and injected. The after-injection is provided to reduce soot mainly generated due to a combustion by the main injection. In a low load region and in a middle-or-high load region except a full open time, the after-injection is basically carried out.

A fuel injection quantity of the main injection and an injection timing of the main injection are determined, with a plurality of maps with gross injection quantity Q and revolution speed Ne parameters preset in accordance with water temperature Tw, atmospheric pressure Patm, and atmospheric (air) temperature Tatm, by searching corresponding values, in the same way as above-described target rail pressure tPrail.

An interval Int from an end of the main injection to a start of the after-injection (refer to FIG. 2) is, similarly, determined on a basis of gross injection quantity Q, revolution speed Ne, water temperature Tw, atmospheric pressure Patm, and atmospheric (air) temperature Tatm.

Soot generated according to the main injection is combusted together with fuel of the after-injection by carrying out the after-injection at an optimum interval in accordance with the driving condition. Hence, a reduction of soot in the middle-or-high load region can be achieved.

However, as described before, in a case where fuel having the low Cetane number is used, the ignition delay of the main combustion is increased and the pre-mixture combustion rate is increased. Consequently, there is a possibility of worsening soot, on the contrary, in association with an execution of the after-injection. Therefore, in this embodiment, when the pre-mixture combustion rate is large, the after-injection is inhibited.

Figure 3:
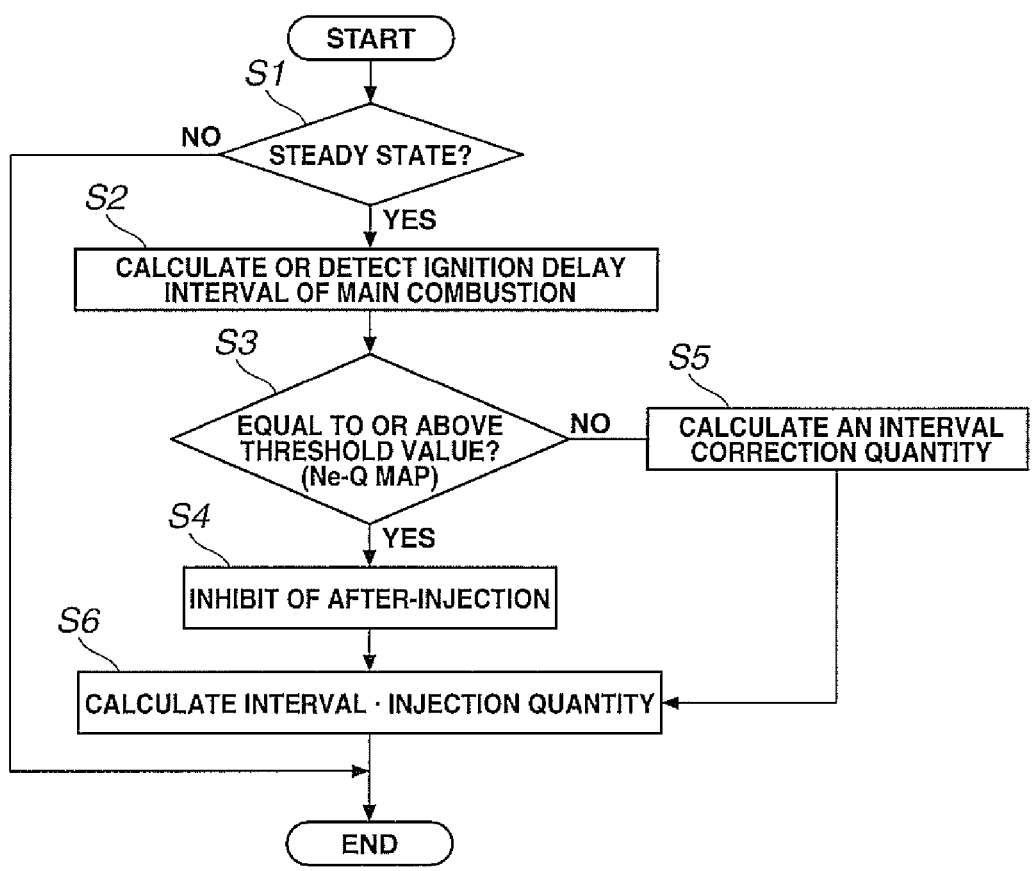
FIG. 3 is a flowchart representing one example of a control.

FIG. 3 shows a flowchart representing one example of a specific process. At a step 1, engine control unit 16 determines whether the driving condition of diesel engine 1 is in a steady state. If engine control unit 16 determines that the driving condition is not in the steady state, no process after a step 2 is carried out. It should be noted that the after-injection itself is also carried out at a transient time if the driving condition is within a predetermined driving condition range.

If the driving condition is in the steady state at step 1, the routine goes to a step 2. At step 2, engine control unit 16 derives the ignition delay interval (period of time) of the main combustion according to the main injection. For example, an internal cylinder rate of heat release is sequentially determined on a basis of the detection signal of internal cylinder pressure sensor 38 and an interval of time until this rate of heat release exceeds a predetermined threshold value is detected as an ignition time delay interval (period of time). The ignition time delay interval (period of time) may be calculated from other parameters not using the internal cylinder pressure sensor 38 detecting an actual combustion state. The ignition delay interval (period of time) may, for example, be calculated from the parameters such as the injection quantity of the pre-injection, atmospheric pressure Patm, boost pressure Boost, the Cetane number of fuel, and so forth. It should be noted that the Cetane number of fuel can be estimated during the driving by an appropriate method.

Next, at a step 3, engine control unit 16 determines whether the above-described ignition delay interval (period of time) is equal to or above a predetermined threshold value or not. This threshold value is determined from a map with gross injection quantity Q and revolution speed Ne as the parameters.

In a case where the ignition delay interval (period of time) is equal to or above the predetermined threshold value, the routine goes to a step 4. At step 4, the after-injection is inhibited. As described before, when the Cetane number of fuel is low and the pre-mixture combustion rate becomes large in association with the increase of the ignition delay, the worsening of soot, on the contrary, is observed. Hence, in a case where the ignition delay interval (period of time) is equal to or above the threshold value, the worsening of soot is avoided due to the inhibit of the after-injection.

If the ignition delay interval (period of time) is not equal to or above (less than) the threshold value, engine control unit 16 allows the after-injection and the routine goes to a step 5. At the step 5, engine control unit 16 calculates a required correction quantity for interval Int from the end of the main injection to the start of the after-injection. This can, for example, be determined on a basis of the parameters of revolution speed Ne, gross injection quantity Q, the injection timing of the main injection, boost pressure Boost, rail pressure Prail, atmospheric pressure Patm, and so forth.

Then, at a step 6, engine control unit 16 determines a final interval Int and the injection quantity of the after-injection.

As described above, in the above-described embodiment, the after-injection is inhibited in a case where the ignition delay interval (period of time) is increased due to the low Cetane number of fuel. Hence, unnecessary worsening of soot due to the after-injection can be avoided.

Figure 4:
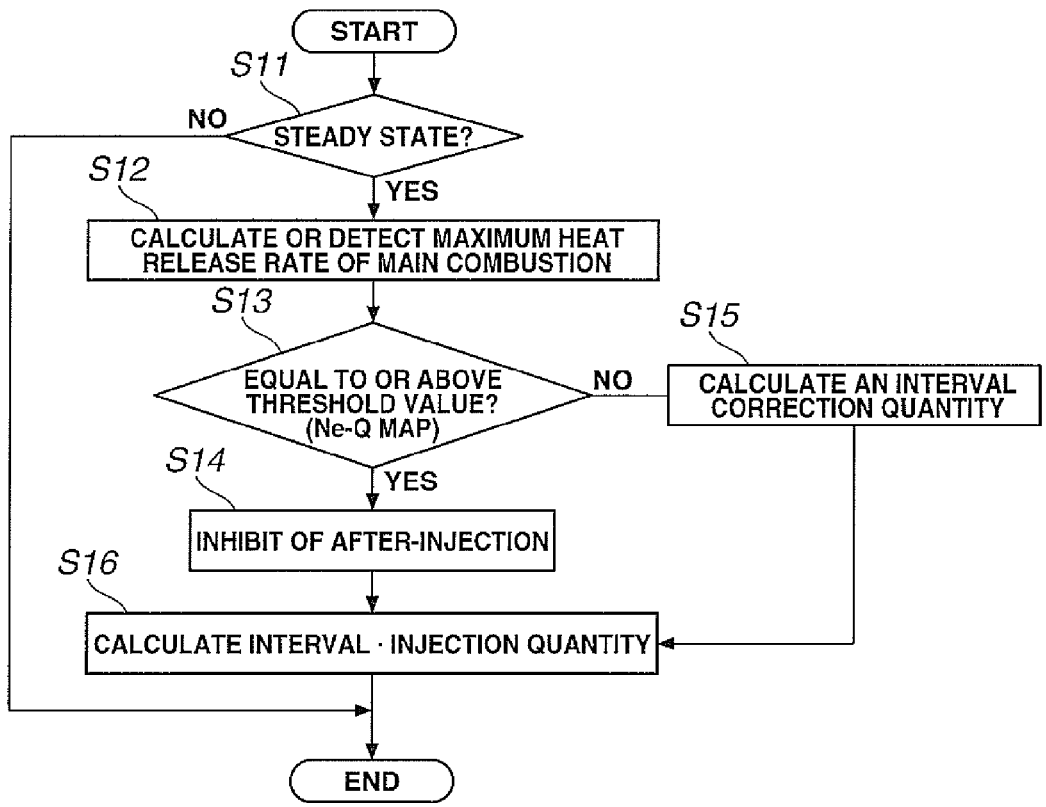
FIG. 4 is a flowchart representing a different example of the control.
Figure 5:
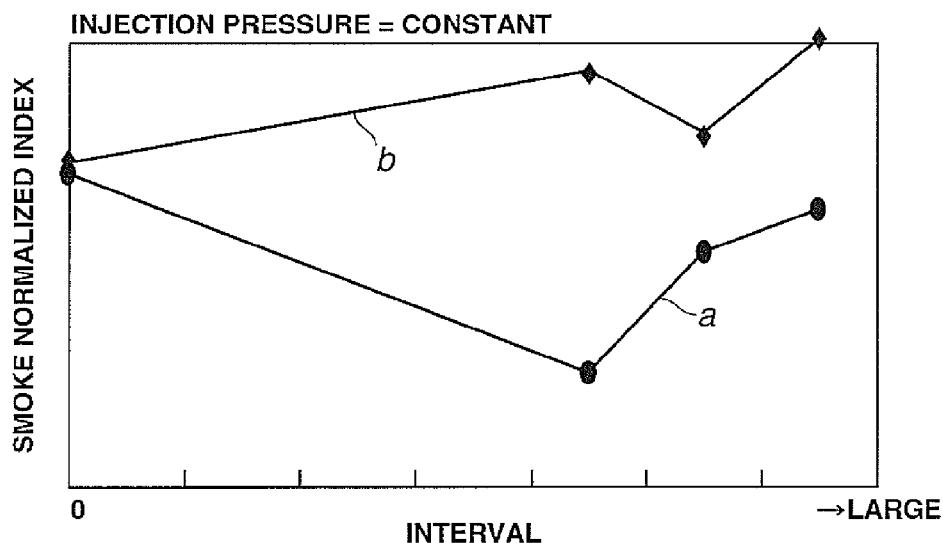
FIG. 5 is a characteristic graph representing a relationship between an interval of an after-injection and soot.
Figure 6A:
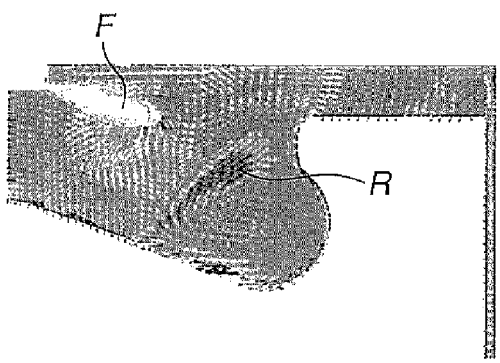
FIGS. 6A-6D are explanatory views representing an influence of a magnitude of a pre-mixture combustion rate on sprays.
Figure 6C:
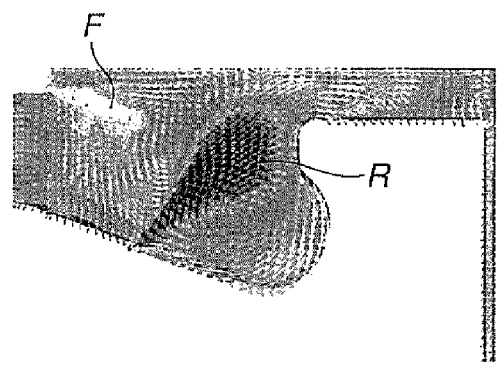
Figure 6B:
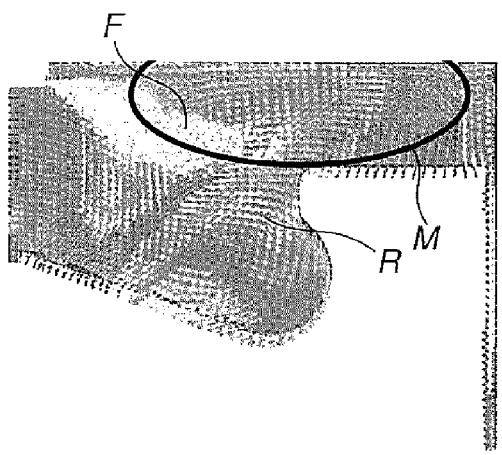
Figure 6D:
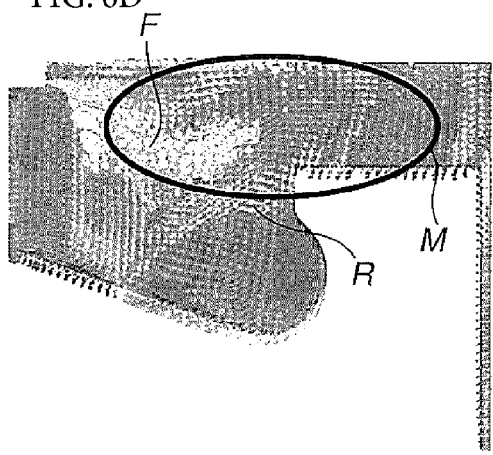

FIG. 4 shows a flowchart representing another example of the specific process. At a step 11, in the same way as above-described step 1, engine control unit 16 determines whether the driving condition of the diesel engine 1 is in the steady state.

If the engine driving condition is in the steady state, the routine goes to a step 12. At step 12, engine control unit 16 determines a maximum rate of heat release of the main combustion caused by the main injection. For example, the internal cylinder rate of heat release is sequentially determined on a basis of the detection signal of internal cylinder pressure sensor 38 and is detected with a maximum value during one cycle as the maximum rate of heat release. Without use of internal cylinder pressure sensor 38 detecting the actual combustion state, the ignition delay interval may be calculated from the other parameters. For example, the ignition delay interval (period of time) can be calculated from the parameters of the injection quantity of the pre-injection, the atmospheric pressure Patm, the boost pressure Boost, intake air temperature Tin, rail pressure Prail, the injection timing of the main injection, revolution speed Ne, the Cetane number of fuel, the main injection quantity, and so forth.

Next, at a step 13, engine control unit 16 determines whether the above-described maximum rate of heat release is equal to or above a predetermined threshold value. This predetermined threshold value is determined from a map with gross injection quantity Q and revolution speed Ne as the parameters.

In a case where the maximum rate of heat release is equal to or above the predetermined threshold value, the routine goes to a step 14. At step 14, the after-injection is inhibited. As described before, when the Cetane number of fuel is low and the pre-mixture combustion rate becomes large, the worsening of soot is, on the contrary, observed. In this example, whether an abrupt combustion such that the pre-mixture combustion rate is large or not is determined on a basis of the maximum rate of heat release. In a case where the abrupt combustion in which the pre-mixture combustion rate is large occurs, the worsening of soot is avoided by the inhibit of the after-injection.

If the maximum rate of heat release is not equal to or above (less than) the predetermined threshold value, the after-injection is allowed and the routine goes to a step 15. At step 15, the required correction quantity for the interval Int from the end of the main injection to the start of the after-injection is calculated. This can, for example, be determined on a basis of the parameters of revolution speed Ne, gross injection quantity Q, the injection timing of the main injection, boost pressure Boost, rail pressure Prail, atmospheric pressure Patm, and so forth.

Then, at a step 16, engine control unit 16 determines final interval Int and the injection quantity of the after-injection.

In this way, in the above-described embodiment, the after-injection is inhibited in a case where the maximum rate of heat release becomes excessive due to the low Cetane number of fuel. The unnecessary worsening of soot according to the after-injection can be avoided.

The invention claimed is:

1. A control apparatus for a direct injection diesel engine, the diesel engine having a fuel injection nozzle capable of performing a multi-stage injection and in which an after-injection is performed immediately after a main injection, the control apparatus is configured to inhibit the after-injection when a pre-mixture combustion rate in a combustion according to the main injection is large.

2. The control apparatus for the direct injection diesel engine as claimed in claim 1, wherein the control apparatus is configured to detect an ignition delay period of time of the main injection as a parameter representing the pre-mixture combustion rate and to inhibit the after-injection when the ignition delay period of time is greater than a threshold value.

3. The control apparatus for the direct injection diesel engine as claimed in claim 1, wherein the control apparatus is configured to determine a maximum heat release rate of the combustion according to the main injection as a parameter representing the pre-mixture combustion rate and to inhibit the after-injection when the maximum heat release rate is greater than a threshold value.

4. The control apparatus for the direct injection 1 diesel engine as claimed in claim 2, wherein the control apparatus is configured to calculate the ignition delay period of time or the maximum heat release rate using a Cetane number of fuel.

5. A control method for a direct injection diesel engine, the diesel engine having a fuel injection nozzle capable of performing a multi-stage injection and in which an after-injection is performed immediately after a main injection, the control method comprising inhibiting the after-injection when a pre-mixture combustion rate in a combustion according to the main injection is large.

6. The control apparatus for the direct injection diesel engine as claimed in claim 3, wherein the control apparatus is configured to calculate the maximum heat release rate using a Cetane number of fuel.

* * * * *